(12) United States Patent
Mundt et al.

(10) Patent No.: US 11,546,311 B2
(45) Date of Patent: Jan. 3, 2023

(54) SYSTEMS AND METHODS USING A NETWORK INTERFACE CONTROLLER (NIC) TO BROKER A SECURE REMOTE CONNECTION AT THE HARDWARE LAYER

(71) Applicant: DELL PRODUCTS L.P., Round Rock, TX (US)

(72) Inventors: Kevin W. Mundt, Austin, TX (US); Jonathan F. Lewis, Round Rock, TX (US); Shawn J. Dube, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 295 days.

(21) Appl. No.: 16/746,336

(22) Filed: Jan. 17, 2020

(65) Prior Publication Data

US 2021/0226935 A1  Jul. 22, 2021

(51) Int. Cl.
| | |
|---|---|
| *H04L 29/06* | (2006.01) |
| *H04L 9/40* | (2022.01) |
| *G06F 21/72* | (2013.01) |
| *H04L 9/32* | (2006.01) |
| *H04L 9/08* | (2006.01) |

(52) U.S. Cl.
CPC .......... *H04L 63/0478* (2013.01); *G06F 21/72* (2013.01); *H04L 9/0819* (2013.01); *H04L 9/3234* (2013.01); *H04L 63/0272* (2013.01)

(58) Field of Classification Search
CPC ............. H04L 63/0478; H04L 63/0428; H04L 9/0819; H04L 9/3234; H04L 63/0272; G06F 21/72
See application file for complete search history.

(56) References Cited

U.S. PATENT DOCUMENTS

| | | | |
|---|---|---|---|
| 9,354,987 B2 | 5/2016 | Zhang et al. | |
| 10,055,357 B2 | 8/2018 | Vidyadhara et al. | |
| 10,185,828 B2 | 1/2019 | Vidyadhara et al. | |
| 2005/0076228 A1* | 4/2005 | Davis | G06F 21/73 |
| | | | 713/188 |
| 2006/0190532 A1 | 8/2006 | Chadalavada | |

(Continued)

OTHER PUBLICATIONS

Mellanox Technologies, "Bluefield-2 SmartNIC for Ethernet" 2019, 3 pgs.

(Continued)

*Primary Examiner* — Yogesh Paliwal
(74) *Attorney, Agent, or Firm* — Egan, Enders & Huston LLP.

(57) ABSTRACT

Systems and methods are provided that may be implemented to use compute capabilities of a network interface controller (NIC) to broker a secure connection across a network between a target information handling system (e.g., such as a server) and one or more other entities (e.g., such as other information handling systems implementing a cloud service or private network, and/or that are providing other remote service/s across the network). This secure connection may be brokered by the NIC at a hardware level in a manner that is separate from a host programmable integrated circuit of the same target information handling system, and in a way that is agnostic and independent of any host operating system or other logic that is executing on the host programmable integrated circuit of the target information handling system.

17 Claims, 3 Drawing Sheets

(56) References Cited

U.S. PATENT DOCUMENTS

| | | | |
|---|---|---|---|
| 2006/0191005 A1* | 8/2006 | Muhamed | H04W 88/08 |
| | | | 726/15 |
| 2006/0212143 A1 | 9/2006 | Nguyen et al. | |
| 2006/0225130 A1* | 10/2006 | Chen | H04L 63/0407 |
| | | | 713/184 |
| 2018/0063088 A1* | 3/2018 | Hardy | H04L 63/0272 |

OTHER PUBLICATIONS

Broadcom, "Stingray PS225," Nov. 19, 2018, 2 pgs.
Wikipedia, "Virtual Private Network" retrieved from the Internet on Dec. 9, 2019, 9 pgs.
www.netronome.com, "What Makes a NIC a SmartNIC, and Why s it Needed?" retrieved from the Internet on Dec. 9, 2019, 3 pgs.
Welcome to Remote Desktop Services, Sep. 27, 2019, 280 pgs.
Tyson et al., "How VPNs Work", How Stuff Works, retrieved from the Internet on Dec. 13, 2019, 9 pgs.
Mundt et al., "System and Method of Establishing Communications With Multiple Information Handling Systems", filed Mar. 12, 2019, U.S. Appl. No. 16/299,540, 44 pgs.

* cited by examiner

SYSTEMS AND METHODS USING A NETWORK INTERFACE CONTROLLER (NIC) TO BROKER A SECURE REMOTE CONNECTION AT THE HARDWARE LAYER

FIELD

This invention relates generally to information handling systems and, more particularly, to remote connectivity for information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many servers are deployed outside of a data center, and in some cases these servers are deployed as a single server unit at a given small business location, e.g., such as retail store, medical office, bank branch office, law firm office, etc. Many of these servers are utilized for workloads where network communication remains within an office or store, but most of these servers are also connected to an external network via an Internet connection. Many server Internet workloads are initiated as a client workload where the server reaches out to a cloud service to complete a transaction or look up something in a corporate data base. There are also workloads where the remote server needs a connection that has been established from an external network, i.e., tunneling into the server from an external network. There is also an emerging Internet of Things (IoT) market in which analytics are performed at the edge and results are sent back to a central office for further study.

In a typical data center deployment, the network is a known network, and the network configurations are known to information technology (IT) personnel. However, when servers are remotely deployed to various different geographic locations that are often globally distributed, it is common for the local network environment (e.g., local network connections and network gear) to vary drastically from one installation to another installation. As an example, consider a chain of retail stores that deploys a separate server at the remote geographic location of each store, with the server for each store being connected to the Internet via a unique local Internet provider utilizing local networking hardware (e.g., router, switches, firewall hardware, etc.) provided by a unique local equipment provider. In most such cases, the local networking hardware employed at one store location is different from the local networking hardware employed at other store locations, e.g., employing different firmware, different languages, etc.

The differing characteristics of local networking hardware deployed at different remote locations, makes the task of deploying and configuring multiple servers in a globally distributed fashion difficult for a corporate IT staff or for a managed service provider supporting small office deployments, i.e., inbound traffic from the Internet to a server via a local network is blocked without special network configurations (e.g., ports and status IP addresses).

SUMMARY

Disclosed herein are systems and methods that may be implemented to use compute capabilities of a network interface controller (NIC) to broker a secure connection across a network between a target information handling system (e.g., such as a server) and one or more other entities (e.g., such as other information handling systems implementing a cloud service or private network, and/or that are providing other remote service/s across the network). This secure connection may be brokered by the NIC at a hardware level in a manner that is separate from a host programmable integrated circuit of the same target information handling system, and in a way that is agnostic and independent of any host operating system or other logic that is executing on the host programmable integrated circuit of the target information handling system.

In one embodiment, the disclosed systems and methods may be implemented using a NIC of a target information handling system (e.g., such as a server) that is connected by a local network to a public network (e.g., such as the Internet). In this embodiment, the NIC may establish external communication and broker a secure connection with the target information handling system from across the public network in a networking environment where establishing such a secure connection would otherwise be difficult using conventional tunneling techniques, i.e., due to a particular, and possibly unknown, configuration of local networking gear or hardware (e.g., router/s, switch/es, firewall hardware, etc.) that connects the target information handling system to the public network. In one embodiment, the disclosed systems and methods may use a NIC of the target information handling system to establish external communication with the target information handling system without requiring tunneling into the target information handling system, i.e., which conventionally requires that a forwarding port be opened on the local network, and that a static IP address assigned to the target information handling system that is visible to an initiating device that is communicating across the public network through the local network to the target information handling system.

In one embodiment, the disclosed systems and methods may be implemented by a virtual private network (VPN) client that is executing on a programmable integrated circuit that is integrated within a NIC of a target information handling system. The programmable integrated circuit of the NIC is separate from the host programmable integrated circuit of the target information handling system, and may establish a VPN across a public network (e.g., the Internet) for encrypting and decrypting VPN communications entirely within the NIC to handle network communications between the primary host programmable integrated circuit and the connection broker, and without any involvement or knowledge of a host OS or any other logic that is executing on the host programmable integrated circuit, i.e., in a way that is transparent to any host OS executing on the host programmable integrated circuit. In this way, neither the host OS or any other logic executing on the host programmable integrated circuit has any knowledge of the VPN, and the resulting VPN is therefore hardened from attack or interference by virtue of hardware hooks used to create the VPN by the programmable integrated circuit of the NIC. Rather, the VPN connection is brokered solely by the NIC, and the host OS has no need to understand network configurations. To the host OS there is a simple (e.g., decrypted) network connection and IP address that is presented by the NIC to the host programmable integrated circuit as though the target information handling system was deployed and connected directly to a local data center without the presence of an intervening public network and any intervening local network hardware.

Thus, one implementation of the disclosed systems and methods is in contrast to a conventional virtual private network (VPN) that is implemented by a VPN client running as an application on top of a host operating system (OS) that communicates with the Internet and is executing on a host central processing unit (CPU) of an information handling system. Unlike the disclosed systems and methods, such a conventional VPN client establishes a VPN through the host OS and across the Internet between the information handling system and a private network that is resident on another information handling system, i.e., a host OS and other logic executing on the host programmable integrated circuit has knowledge of, and is involved with, establishing a conventional VPN over the Internet with the other system/s.

In one embodiment, a NIC of a target information handling system (e.g., a server deployed at a customer or member site) may include a programmable integrated circuit executing a VPN client that is pre-configured to securely tunnel out through a local network and across a public network to a separate connection broker (e.g., another information handling system) that is coupled to the same public network as is the target information handling system. In one exemplary embodiment, communication with the connection broker may be so initiated by the NIC when the target information handling system is booted, and the NIC may use cryptographic keys built into the hardware (e.g., non-volatile memory of the NIC) of the target information handling system as credentials for a VPN login to the connection broker system. The VPN client on the target information handling system may tunnel into the connection broker system to establish a first VPN connection that is placed into a secure subnet on the connection broker that is allocated to a given entity or class of entities (e.g., customers, members, etc.) assigned to, or otherwise corresponding to, the target information handling system.

In the above embodiment, a second and different information handling system may separately communicate through its own local network (e.g., such as a primary data center network for customers or members) to also establish a second VPN connection from its local network into the connection broker system using any suitable technique for establishing a VPN connection, e.g., using a VPN client executing on a NIC of the second information handling system, a VPN client executing on top of a host OS executing on a host programmable integrated circuit of the second information handling system, etc. Once established, the second VPN connection is placed in the same secure subnet on the connection broker as is the first VPN connection so that both connections are now on the same virtual network. In this way, a target information handling system (e.g., such as a server) may be shipped to a remote deployment site and connected to a public network via local network hardware, and the target information handling system may then be powered on and booted up at its remote site to automatically determine its connected network environment and to automatically attach to the Internet or other public network through various network configurations.

It will be understood that a similar methodology as described above may be implemented to establish additional separate VPN connections from additional separate respective target information handling systems (e.g., one or more additional customer or member servers) to the same connection broker system. In such a case, the connection broker system may place the separate VPN connections corresponding to the multiple different servers on the same secure subnet (and stitch all the server systems into a common virtual network) where the multiple separate respective target information handling systems are affiliated with (and/or operate together with) each other.

In one respect, disclosed herein is an information handling system, including: a first programmable integrated circuit; and a network interface controller (NIC) coupled to the host programmable integrated circuit and implementing a network interface, the NIC including a second programmable integrated circuit integrated within the NIC and programmed to broker an encrypted connection across a network between the second programmable integrated circuit of the NIC and one or more external network entities separately from the first programmable integrated circuit.

In another respect, disclosed herein is a method, including: operating a host programmable integrated circuit of a first information handling coupled to a second programmable integrated circuit integrated within a network interface controller (NIC) of the first information handling system, the second programmable integrated circuit of the NIC being coupled in communication between the host programmable integrated circuit and a network; and operating the second programmable integrated circuit of the NIC to broker a first encrypted connection across the network between the second programmable integrated circuit of the NIC and a third programmable integrated circuit of a second information handling system in a manner that is separate from the host programmable integrated circuit of the first information handling system.

DESCRIPTION OF ILLUSTRATIVE EMBODIMENTS

Figure 1:
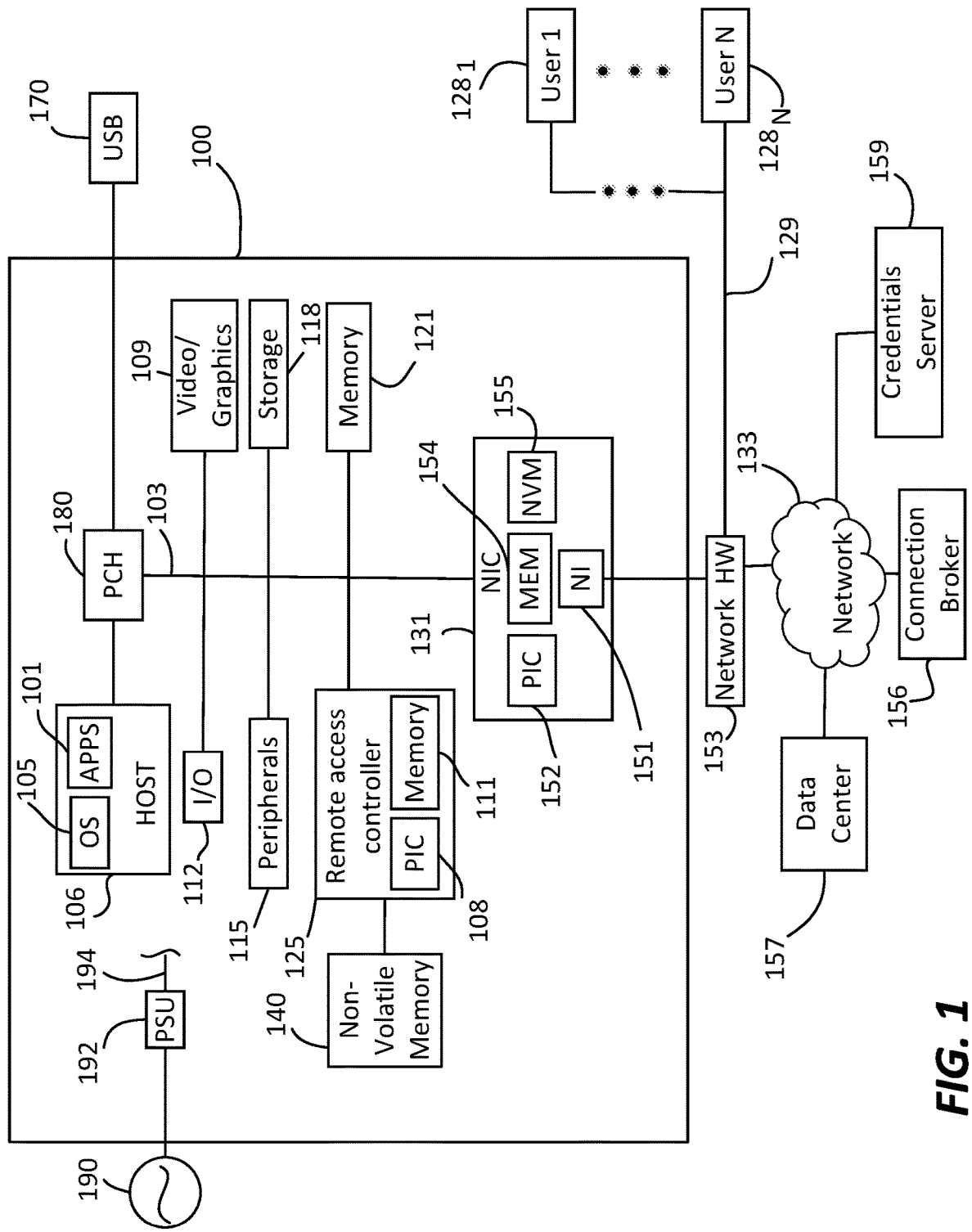
FIG. 1 illustrates a block diagram of an information handling system according to one exemplary embodiment of the disclosed systems and methods.

FIG. 1 illustrates a block diagram of an information handling system 100 (e.g., such as a server or internet of things "IoT" device) as it may be configured according to one exemplary embodiment. As shown, system 100 may include at least one host programmable integrated circuit 106 (e.g., AMD or Intel-based CPU such as Itanium or any other type of suitable programmable integrated circuit), one or more buses or communication media 103 (e.g., PCIe bus, USB, SMBus, SATA, other appropriate data buses such as memory bus, etc.), video/graphics hardware (e.g., video adapter or graphics processor unit) 109, storage 118, system volatile memory (e.g., dynamic random access memory "DRAM") 121, local input/output (I/O) 112, peripherals 115, and remote access controller (RAC) 125 having one or more out-of-band programmable integrated circuits 108 and non-volatile memory (NVM) 111 that stores, among other things, remote access controller component firmware. Examples of remote access controller 125 include an integrated Dell Remote Access Controller (iDRAC) available from Dell Technologies of Round Rock, Tex., etc.).

As shown in the exemplary embodiment of FIG. 1, out-of-band programmable integrated circuit 108 of RAC 125 is a separate and independent programmable integrated circuit that is separate from any in-band host central processing unit (CPU) such as host programmable integrated circuit/s 106, and may operate without management of unified extensible firmware interface (UEFI) 142, any separate system BIOS and any application 101 executing with a host OS 105 on the host programmable integrated circuit/s 106. Out-of-band programmable integrated circuit 108 may be, for example, a service processor, baseboard management controller (BMC) embedded processor or integrated microcontroller, etc. In one embodiment, out-of-band programmable integrated circuit 108 be implemented as a BMC that monitors the physical state of various components of information handling system 100, and that executes BMC component firmware that may be stored on integrated non-volatile memory 111. In some embodiments, remote access controller 125 may also provide access to allow remote users to manage, administer, use, and/or access various resources of host system 100 (e.g., either native or virtual) from a remote location, e.g., via network 133 and/or other suitable communication media.

In FIG. 1, bus/es 103 provides a mechanism for the various components of system 100 to communicate and couple with one another. As shown, host programmable integrated circuit/s 106 may be coupled in on embodiment to bus/es 103 via embedded platform controller hub (PCH) 180 which may be present to facilitate input/output functions for the host programmable integrated circuit/s 106 with various internal components of information handling system 100. Host programmable integrated circuit/s 106 may include an in-band programmable integrated circuit configured to execute a host operating system (OS) 105 and application/s 101, and an out-of-band programmable integrated circuit 108 of remote access controller 125 may be an embedded processor or microcontroller, etc. Video/graphics 109, storage 118, memory 121, I/O 112 (e.g., keyboard, mouse, etc.) and any other optional peripherals 115 may have the structure, and perform the functions known to those of skill in the art.

As shown, information handling system 100 may also include a network interface controller (NIC) 131 that is communicatively coupled to public network 133 (e.g., Internet) via local network hardware 153 (e.g., such as an unmanaged switch, firewall, router, wireless access point, consumer-grade Internet connection, etc.) as shown to allow various components of system 100 to communicate with external and/or remote device/s (including connection broker system 156) across network 133. In the illustrated embodiment, NIC 131 includes both a network interface 151, a programmable integrated circuit 152 (e.g., in the form of a CPU, FPGA, etc.), associated memory 154, and non-volatile memory (NVM) storage 155. In such an embodiment, the NIC programmable integrated circuit 152 may be programmed to perform tasks such as encryption and decryption on the fly, security protocols, and/or or compression and de-compression on the fly, and may be programmed to establish a VPN network communication that remains open and active for network communications between the host programmable integrated circuit 106 and the connection broker system 156 for as long as the system 100 remains booted and operating. In one exemplary embodiment, NIC 131 may be a "Smart NIC" of the type available from suppliers such as a Bluefield®-2 SmartNIC for Ethernet (e.g., part number MBF2M322A-AENOT) available from Mellanox Technologies® of Sunnyvale, Calif., or a Stingray™ PS225 (e.g., part number BCM958802A8044C) available from Broadcom® of San Jose, Calif.

In one embodiment, local network hardware 153 may also provide access to a local area network 129 (e.g., wired or wireless LAN) that provides communication between system 100 and optional local user devices $128_1$ to $128_N$ which exchange local data with system 100 separately from and outside of public network 133. Local user devices 128 may be, for example, cash registers, notebook or desktop computers, tablet computers, smart phones, etc. System 100 may exchange data with local user devices 128 across LAN 129 and, in one embodiment, may act as a server that accepts data from local user devices 128, provides data to local user devices 128, performs data processing for local user devices 128, and/or administers or configures local user devices 128, etc.

In the embodiment of FIG. 1, other external devices, such as external universal serial bus (USB) device 170 may be coupled to programmable integrated circuit/s 106 of system 100 via PCH 180 as shown. In this embodiment, information handling system 100 also includes power supply unit (PSU) 192 (including PSU component firmware 195) that is coupled to receive power from AC mains 190 and to perform appropriate power conversion and voltage regulation to produce regulated internal power 194 for use by other power-consuming components of system 100.

Still referring to FIG. 1, remote access controller 125 is coupled to persistent non-volatile memory storage 140 (e.g., embedded and partitioned flash memory, Electrically Erasable Programmable Read Only Memory—EEPROM, other types of non-volatile random access memory "NVRAM", etc.) that is configured to store persistent information for remote access controller 125 and information for other system components, e.g., including Unified Extensible Firmware Interface (UEFI) firmware as well as other information such as Advanced Configuration and Power Interface (ACPI) information, other system BIOS firmware (e.g., in the form of system management SMBIOS data), etc.

It will be understood that the embodiment of FIG. 1 is exemplary only, and that an information handling system 100 may be provided with one or more programmable integrated circuits that may perform the functions of host programmable integrated circuit/s 106, out-of-band programmable integrated circuit 108, BMC programmable integrated circuit 119, NIC programmable integrated circuit 152, etc. Examples of such programmable integrated circuits include, but are not limited to, central processing units (CPUs), embedded microcontrollers, application specific integrated circuits (ASICs), field programmable gate arrays (FPGAs), etc. It will also be understood that the particular configuration of FIG. 1 is exemplary only, and that other information handling system architectures may be employed in the practice of the disclosed systems and methods.

Besides system 100, FIG. 1 also illustrates a connection broker system 156 and a data center 157 that are each communicatively coupled to public network 133, and which may be positioned at separate respective geographic locations from the geographic location of system 100. For example, in one exemplary embodiment, system 100 may be operated as a server by a first business, governmental or other entity and located at a first geographic location (e.g., such as at a retail store location, auto parts store, insurance office, medical office, bank branch office, law firm office, post office, etc.) to serve one more local user devices $128_1$ to $128_N$ (e.g., cash registers, notebook or desktop computers, tablet computers, smart phones, etc.) at the same first geographic location. Server duties performed by system 100 may include tasks such as data processing and/or storage for data input from local user devices 128, providing output data or other information to local user devices 128, etc.

At the same time, connection broker system 156 of FIG. 1 may be owned or operated by a second and different business, governmental or other entity (e.g., such as a computer manufacturer or other service provider) and may be maintained at a second geographic location (e.g., that serves as an office or data center for the second business entity) that is different from the first geographic location. Data center 157 may be operated (e.g., as a corporate or governmental data center) at a third and different geographic location (e.g., at a home office) by, for example, the first business, governmental or other entity or by another such entity. In one embodiment, the first entity may be a customer of the second entity. In any case, each of information handling system 100 and data center 157 may communicate with connection broker system 156 across network 133 in a manner as described further herein.

It will be understood that each of connection broker system 156 and data center 157 may be implemented using one or more information handling systems having compute, storage, memory and network interface components suitably configured and/or programmed to perform the tasks described herein for those components. For example, each of connection broker system 156 and data center 157 may be implemented with at least one server that is configured similar to information handling system 100, although it is possible that such servers may alternately include conventional NICs rather than smart NICs such as described in relation to system 100 of FIG. 1.

Figure 2:
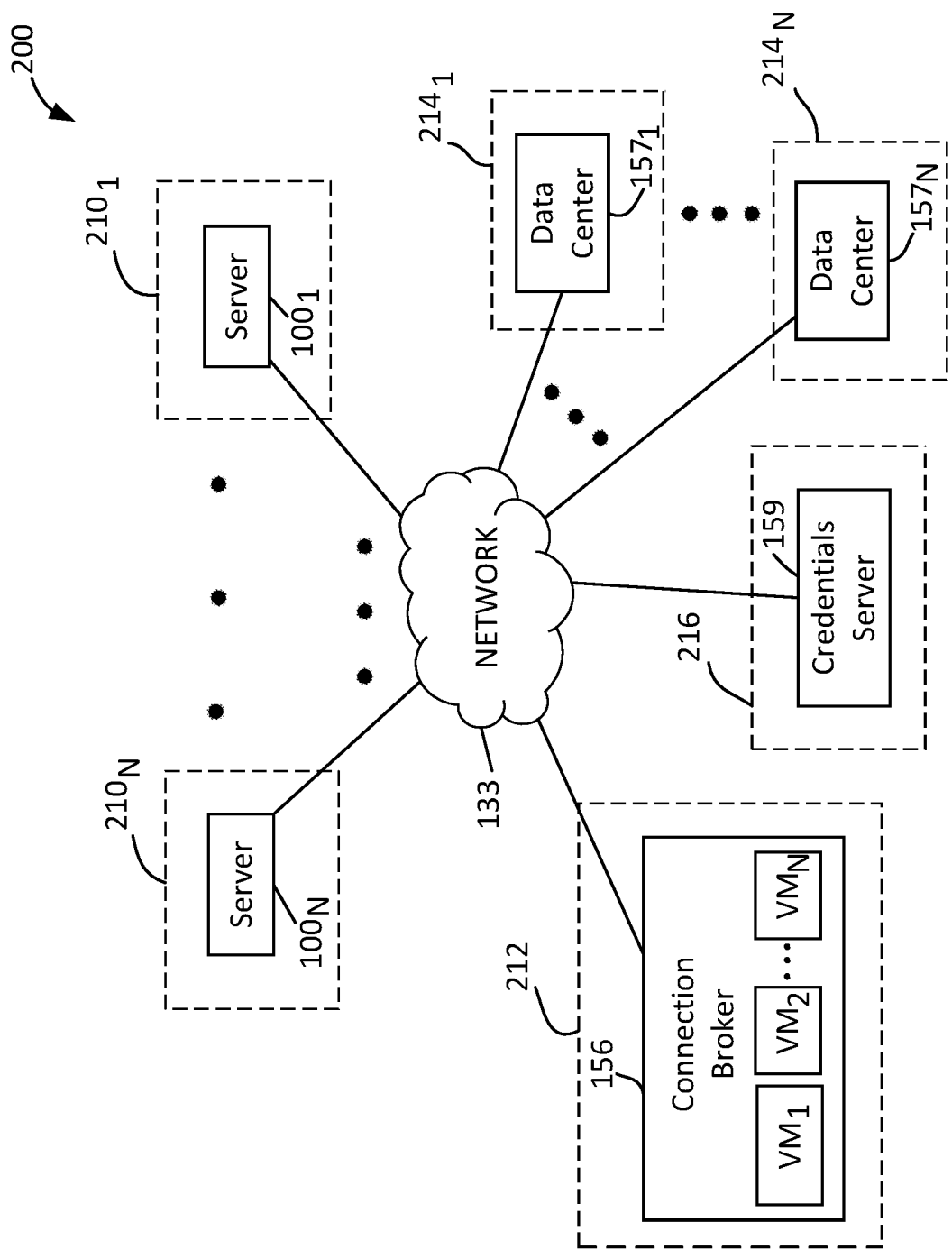
FIG. 2 illustrates a network environment according to one exemplary embodiment of the disclosed systems and methods.

FIG. 2 illustrates a network environment 200 that includes two or more different and distributed servers $100_1$ to $100_N$ that are each coupled to communicate across network 133 with a connection broker system 156. Connection broker system 156 is, in turn, coupled to communicate with two or more different data center systems 15'71 to $157_N$ across network 133. Each of servers $100_1$ to $100_N$ may be located as shown at different respective geographic locations $210_1$ to $210_N$ from each other, connection broker system 156 may be located at another different location 212, and each of data center systems 15'71 to $157_N$ may be located as shown at other different respective geographic locations 2141 to $214_N$ from each other. It will be understood that each of servers $100_1$ to $100_N$ may be coupled to network 133 at its respective location 210 by a separate co-located installation of local network hardware 153, and may serve one or more co-located local users 128 (e.g., such as illustrated in FIG. 1) at its respective location 210 via a co-located LAN 129. In one embodiment, an optional credential server 216 may be located at its own location 216 that may be different from the other locations 210, 212 and 214.

In one embodiment, each of servers $100_1$ to $100_N$ and a single data center system 157 of FIG. 2 may be owned or owned or operated by a common business, governmental or other entity (e.g., each of locations $210_1$ to $210_N$ may be offices or other locations owned or owned or operated by the same entity that operates the data center system 157 at data center location 214). In such an embodiment, connection broker system 156 may host a secure client-initiated VPN connection established from each of servers $100_1$ to $100_N$, and may link each of these secure VPN connections to the same common one of data center systems 157 (i.e., that is owned or owned or operated by the same entity that operates servers $100_1$ to $100_N$) via a respective and separate second secure connection.

In another embodiment, two or more of servers $100_1$ to $100_N$ may be owned or owned or operated by different business, governmental or other entities from each other (e.g., each one of locations $210_1$ to $210_N$ may be offices or other locations owned or owned or operated by a different entity, at least two of locations $210_1$ to $210_N$ may be offices or other locations owned or owned or operated by the same entity while another location 210 may be an office or other location owned or operated by a different entity, etc.). In such an embodiment, two or more of data center systems $157_1$ to $157_N$ may also be owned or operated by different business, governmental or other entities from each other. In such a case, connection broker system 156 may host a secure client-initiated VPN connection established from each of the two or more servers $100_1$ to $100_N$, and may link each of these secure connections to a respective different one of data center systems $150_1$ to $157_N$ (that is owned or operated by a corresponding business, governmental or other entity) via a respective and separate second secure connection.

As further shown in FIG. 2, connection broker system 156 may optionally implement multiple virtual machines (VMs) $161_1$ to $161_N$ that are each assigned to a respective different one of business, governmental or other entities that operates at least one of servers $100_1$ to $100_N$ and that operates one of data center systems $157_1$ to $157_N$. To illustrate example operation of such a network architecture, assume that a given entity operates at least one given server $100_x$ and also operates at least one given data center system $157_x$. In such a configuration, a NIC 131 of the given server $100_x$ may establish a VPN connection to a given VM $161_x$ implemented on connection broker system 156, e.g., based on the credentials of the server $100_x$ provided by the NIC 131 to the connection broker system 156. This allows the given entity to deploy its VPN of choice within its given assigned VM $161_x$ on connection broker system 156, and to establish a secure connection back to its corresponding data center $157_x$. The VPN connection from the given server $100_x$ and the VPN connection from the given data center system $157_x$ may then be bridged within connection broker system 156 by a packet reflector implemented in the given assigned VM $161_x$ on connection broker system 156 to establish a contiguous data path from the given server $100_x$ to the given data center $157_x$.

It will be understood that this same connection process may be employed to establish multiple simultaneous secure connections (and contiguous data paths) between different servers 100 and different respective data centers 157 through different respective assigned VMs 161 that are simultaneously running on connection broker system 156. In this way, multiple separate secure connections may be established at the same time through different respective VMs 161 on a common connection broker system 156, e.g., so that a first server 100 assigned to a first entity may be securely connected to a first data center system 157 also assigned to the first entity via a first one of VMs 161 assigned to the first entity, while at the same time at least one other second server 100 assigned to a different second entity is securely connected to a second and different data center 157 also assigned to the second entity via a second and different one of VMs 161 assigned to the second entity.

It will be understood that in other embodiments a given VM 161 assigned to a given entity on a connection broker system 156 may be utilized for purposes other than implementing the given entity's selected VPN client. For example, system management and configuration functions as well as additional security functions may be implemented on a connection broker system 156 by a VM 161 assigned to the given entity, e.g., such as by running a firewall, virus protection, traffic monitoring, etc. on the entity's given assigned VM 161. In this way, security capabilities applied in a cloud environment on the connection broker 156 may be implemented and utilized to support the needs of multiple distributed servers $100_1$ to $100_N$, eliminating the need for distributed security appliances.

In some embodiments, additional security may be provided to harden a VPN connection from a server 100 and a connection broker system 156. For example, an additional network pipe (e.g., a second and different secure connection) may be implemented for on-the-fly two factor authentication along with hardware keys that are built into NIC 131 (e.g., stored in NIC non-volatile memory 155) of the server 100. For example, a separate MQ Telemetry Transport (MQTT) connection may also be established (e.g., to be active at the same time as the VPN) by a NIC 131 and utilized to create an out-of-band security path by negotiating security keys and VPN handoffs/timing to maintain a constantly evolving and secure VPN connection for network communications between the host programmable integrated circuit 106 and the connection broker system 156. This separate MQTT connection path may be established to remain open and active with the VPN connection so as to enable security (e.g., firewall capabilities) for the VPN connection as long as it remains established and active.

Beyond the VPN network created between the server 100 and connection broker system 156, the MQTT connection may be established and configured to take a different internet path (e.g., such as a time based credentials server 159 located in a different location 216 than the connection broker 156 as shown in FIG. 1) than the VPN network created between the server 100 and connection broker system 156, i.e., so that the MQTT data and the VPN data are segregated from each other. Implementing different MQTT data and VPN data makes it more difficult for bad actors to become the "man in the middle", i.e., it is harder to become a man in the middle of both of the separate MQTT and VPN network communication paths than it is to become a man in the middle of a single VPN network communication path. Additional information on MQTT IoT connections and remotely asserting an event with a programmable integrated circuit is described in U.S. patent application Ser. No. 16/299,540 filed on Mar. 12, 2019, which is incorporated herein by reference in its entirety for all purposes.

In one embodiment, a MQTT service may be implemented across MQTT connections established across network 133 between credentials server 159 and each of connection broker 156 and NIC 131 of server 100, and either at the same time that the VPN connection exists between server 100 and connection broker 156 or at a time that the VPN connection is not currently active (e.g., such as when the VPN connection has expired or otherwise is not currently established). In this embodiment, credentials server 159 may be operated to negotiate keys, and the MQTT service may be so established across network 133 to implement evolving keys and/or encryption for the use by the VPN connection between connection broker 156 and server 100, e.g., in a manner that is similar to two factor authentication in that VPN keys may be provided across the MQTT connection from credentials server 159 at specific intervals and/or from a second trusted source/channel to each of connection broker 156 and server 100.

In one embodiment, appropriate sets of VPN keys may be given by credentials server 159 across the MQTT connection to connection broker 156 and the server 100, e.g., so that the VPN encryption scheme used by connection broker 156 and server 100 evolves as new keys are granted. The intervals at which new VPN keys are provided across the MQTT connection to the connection broker 156 and the server 100 may be set or otherwise chosen as desired to fit a given application, e.g., such as at every occurrence of a new system boot of connection broker 156 and/or server 100, once per day or every 24 hours or another elapsed defined time interval (e.g., 6 hours, 12 hours, etc.).

Figure 3:
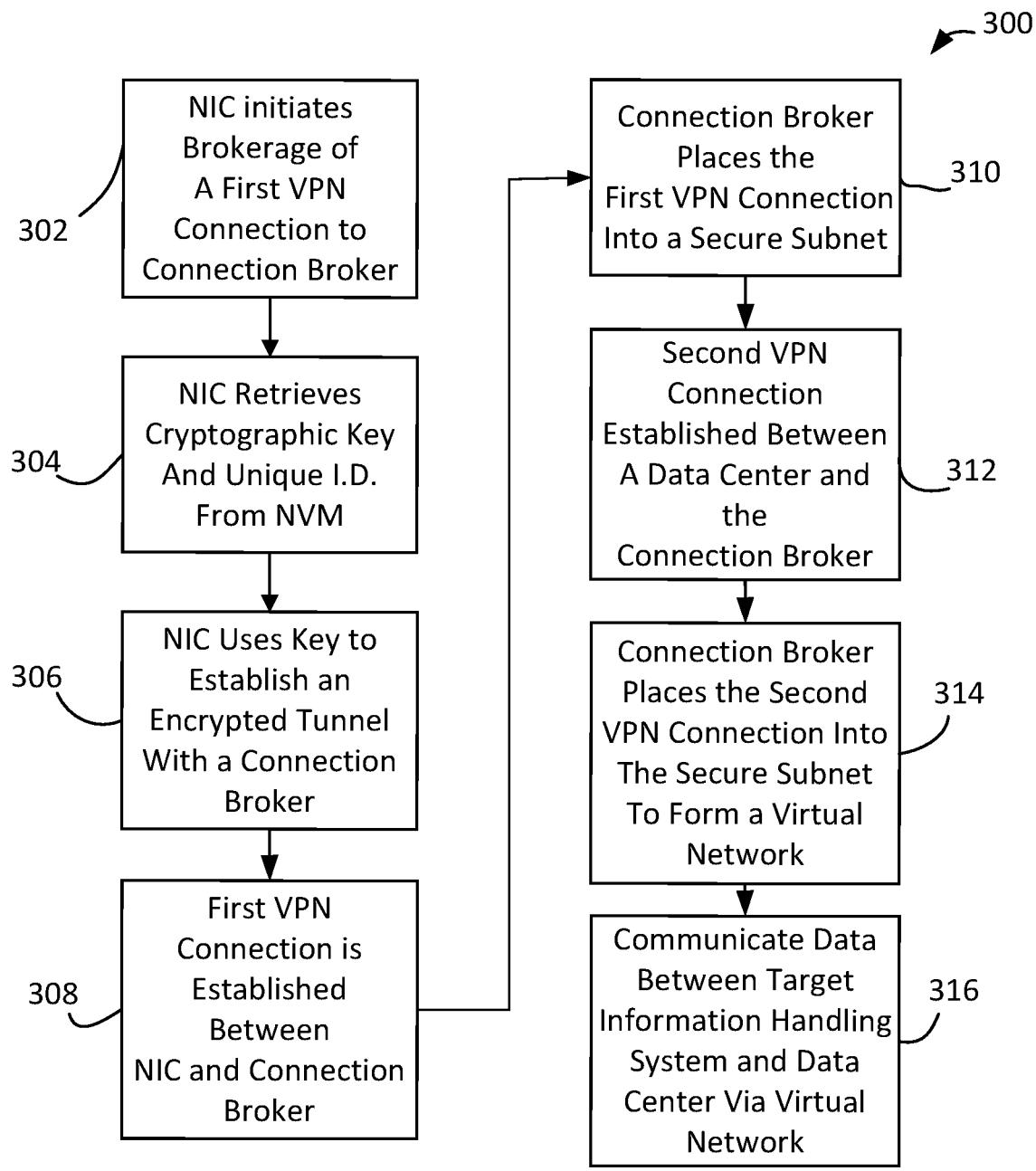
FIG. 3 illustrates methodology according to one exemplary embodiment of the disclosed systems and methods.

FIG. 3 illustrates methodology 300 that may be implemented using a NIC 131 to tunnel out and broker a secure connection across network 133 between a target information handling system 100 (e.g., server) and a given data center 157 via a connection broker system 156. Although described in relation to the embodiment of FIGS. 1 and 2, it will be understood that similar methodology may be implemented to broker a secure connection across a network from other configurations of information handling systems that employ a NIC that is configured and programmed to perform the tasks described herein for NIC 131.

As shown in FIG. 3, methodology starts in step 302 where the NIC 131 of the target information handling system is programmed to initiate methodology 300 to broker a first VPN with connection broker system 156 across network 133. This programming may be previously stored in and retrieved from non-volatile memory 155 and executed by programmable integrated circuit 152 of NIC 131. This action may automatically occur, for example, upon power on and/or host OS booting of the target information handling system 100, including the first power on and/or host OS boot of the information handling system 100 after it is deployed (e.g., as a bare metal server initially having no installed host OS 105) at a geographic location 212 corresponding to a remote facility, such as a store, office, etc. At this time, NIC 131 is notified of the system start up and/or boot of host OS 105 via signal from the host programmable integrated circuit 106 via PCH 180, and NIC 131 responds to this notification by initiating methodology 300.

Next, in step 304, NIC 131 retrieves a cryptographic key stored in its non-volatile memory 155 and uses this key in step 306 to tunnel across network 133 into a programmable integrated circuit of connection broker system 156 to authenticate and establish an encrypted tunnel with connection broker system 156, without knowledge of host OS 105 executing on host programmable integrated circuit 106. A tunnel may be so authenticated using symmetric key encryption, public key encryption or any other suitable encryption methodology.

For example, a unique public key for the connection broker system 156 may be previously stored on NIC 131 and used by NIC 131 to tunnel out to connection broker system 156 with an encrypted request that includes a unique identifier (ID) assigned to the target information handling system 100 and also retrieved in step 304 from storage in NIC non-volatile memory 155. An IP address and/or other network location information for connection broker system 156 may also be previously stored on non-volatile memory 155 of NIC 131, and retrieved and used by programmable integrated circuit 152 of NIC 131 in step 306 to communicate a tunnel request to connection broker system 156 across network 133.

The connection broker may use its corresponding unique private key for decryption of the communication received from NIC 131, including the unique ID for target information handling system 100. The connection broker may maintain in its non-volatile memory a stored correlation (e.g., lookup table) of unique public keys corresponding to the unique IDs of one or more other devices, including target information handling system 100. The connection broker may use this stored correlation to determine the unique public key of NIC 131 of information handling system 100 from the decrypted unique ID of target information handling system 100, and then use this unique public key to encrypt return communications to NIC 131 of target information handling system 100, which decrypts the return communication using its unique private key which is previously stored on and then retrieved from NIC non-volatile memory 155.

In the alternative case of symmetric key encryption, both the NIC 131 and programmable integrated circuit of connection broker system 156 may use the same encryption key (stored in non-volatile memory of each system) for encrypting and decrypting communication at both ends of the tunnel. This symmetric key may be unique to the target information handling system 100, and may be correlated with the unique ID of the target information handling system 100 using a correlation stored on, and retrieved from, non-volatile memory of connection broker system 156 in a manner similar to that described above for the unique public key of target information handling system 100.

Using the established tunnel of step 306, a first encrypted VPN connection is established in step 308 for communication between target information handling system 100 and connection broker system 156. The first encrypted VPN connection communicates with encapsulated packets using the aforementioned encryption keys together with any suitable tunneling protocol that is executing on both NIC 131 and connection broker system 156, e.g., such as a Point-to-point Protocol (PPP) like Layer 2 Forwarding (L2F), Point-to-point Tunneling Protocol (PPTP), Layer 2 Tunneling Protocol (L2TP), etc.

In an optional embodiment where connection broker system 156 implements one or more VMs 161 for handing VPN connections with target information handing systems 100, a VPN tunnel may be established in step 308 between the target information handling system 100 and a given VM 161 connection broker system 156 executing on the connection broker system 156. In this regard, a particular VM 161 may be selected by the connection broker system 156 for connection to the target information handling system 100 based on the unique ID of the target information handling system 100, e.g., based on a determined correlation between the particular VM 161 and the target information handling system that is stored (e.g., as a lookup table or other listing) on non-volatile memory of the connection broker system 156.

In step 310, the connection broker system 156 may place the first VPN connection of step 308 into a secure subnet, e.g., that is allocated to a given entity (e.g., a business entity such as a company, a governmental entity, etc.) or class of entities (e.g., customers, members, etc.) assigned to, or otherwise corresponding to, the target information handling system 100.

In step 312, a given data center 157 may separately communicate across network 133 with connection broker system 156 to establish a second and different VPN connection with the connection broker system 156 using any suitable technique, e.g., using a VPN client executing on a NIC of data center 157 (similar to information handling system 100), a VPN client executing on top of a host OS executing on a host programmable integrated circuit of the given data center 157, etc. Once connected and logged onto the connection broker system 156, the data center 157 may be made aware of the existence of the first VPN connection from the target information handling system 100 (e.g., including the identity of the particular system 100), such as in a graphical user interface display (GUI). The connection broker 156 may then give a user of the data center 157 to select to connect to the target information handling system 100, although such connection may also be automatic in an alternate embodiment.

Upon user selection or automatic connection, the established second VPN connection may in step 314 be placed in the same secure subnet on connection broker system 156 as is the first VPN connection, and these VPN connections may be bridged within the connection broker system 156 to establish a contiguous data path from the host programmable integrated circuit 106 (e.g., from the host OS 104 and/or applications 101 executing on the host programmable integrated circuit 106) through NIC 131 of the target information handling system 100 to the given data center 157 on the same virtual network (VPN) in step 316. In step 316, the NIC programmable integrated circuit 152 encrypts data received from the host programmable integrated circuit 106 for transmission to the network 133 as encrypted VPN communications and decrypts encrypted VPN communications received from the network 133 to provide decrypted data from these VPN communications to the host programmable integrated circuit 106.

Connection broker system 156 may determine in step 314 to join the target information handling system 100 into such a common virtual network together with the given data center 157, for example, when the unique IDs of the target information handling system 100 and of given data center 157 are determined to be linked to each other, such as when they are assigned or otherwise allocated to a common entity (e.g., a business entity such as a company, a governmental entity, etc.). In one optional embodiment, such a virtual network may be established within a given VM 161 on connection broker system 156, e.g., a VM 161 which is allocated to the same common entity as the target information handling system 100 and given data center 157. In an alternate embodiment, a packet reflector may be implemented on the connection broker to bridge the separate and independently-operating first and second VPNs to provide the secure data path from the target information handling system 100 to the given data center system.

In one embodiment, the virtual network established in step 316 may be maintained whenever the target information handling system 100 is booted and running, e.g., such that the remote access controller 125 (e.g., iDRAC) and the programmable integrated circuit 106 of the host compute complex always have an Ethernet or other network connection back to managing information technology (IT) personnel who are using data center 157. For example, a bare metal server 100 having no installed host OS 105 may be deployed to any location with power and an Internet connection. Upon first power on of the bare metal server system 100 with no host OS, the server NIC 131 may then establish a secure VPN connection back to the managing IT entity on the data center 157 and the server 100 may then be managed and provisioned (e.g., with configuration of VPN ports, installation of host OS 105 and/or applications 202 onto the host programmable integrated circuit 106, etc.) from the data center 157 as though it were on a local network, e.g., without requiring manual interaction with the bare metal server at its deployed geographic location. In addition, the host OS 105, once so installed, requires no understanding of a network connection or additional VPN capabilities. Rather, the host OS 105 sees only a conventional Ethernet port presented by NIC 131 and proceeds to establish a connection.

In one embodiment, connection broker 156 may provide one or more centralized services for a group of information handling systems 100 (e.g., servers) which are distributed at different geographic locations 210, and without requiring these services to be provided at the individual geographic locations 210 themselves. Examples of such centralized services include, but are not limited to, monitoring VPN traffic between systems 100 and data center 157 for suspicious data, virus protection and/or firewall for systems 100, service management tools from data center 157 to individual systems 100, any other security service for systems 100, etc. Moreover, a connection broker 156 may be programmed to present a list of connected target systems 100 to an administrator or other use of a data center system 157, together with other information such as current system status, system identity, etc. for each target system 100.

In a further embodiment, IT personnel may communicate across the virtual network established at first system boot in step 316 through a first connection broker system 156 to the target information handling system 100, and then use the first connection broker system 156 as a configuration portal for the NIC 131 to change the VPN client executing on NIC 131 so that from then on it establishes a different VPN connection with a different connection broker system 156 during future system boots. For example, a customer's newly deployed system may be programmed to initially utilize a first connection broker system that is operated and maintained as a configuration portal by an information handling system manufacturer to establish a VPN connection for initial configuration of the new system, and to also point the new system's NIC to a different connection broker system (e.g., maintained by the customer itself) to use for all future VPN connections established from the NIC of the customer's deployed system.

In one embodiment, it is possible that multiple target information handling systems 100 may establish their own respective separate VPN connections with connection broker system 156 in a similar manner using methodology of steps 302-312 so that the multiple separate VPN connections are simultaneously active. Then in step 314, the connection broker system 156 may place these simultaneously-active separate VPN connections corresponding to the multiple different target information handling systems 100 onto the same secure subnet within connection broker system 156 so as to stitch or join all the target information handling systems 100 into a common virtual with the second VPN network established in step 312, so that the joined target information handling systems 100 may communicate with each other and with the given data center 157. Connection broker system 156 may determine to join the multiple target information handling systems 100 into such a common virtual network, for example, when the unique IDs of the multiple target information handling systems 100 and of given data center 157 are all determined to be linked to each other such as when they are assigned or otherwise allocated to a common entity (e.g., a business entity such as a company, a governmental entity, etc.). In one embodiment, a connection broker system 156 and multipole target information handling systems 100 maybe so joined into a common virtual network on a single VM 161, e.g., when VM 161 is allocated to the same common entity as the target information handling system 100 and given data center 157.

It will be understood that the steps of methodology 300 are exemplary only, and that any other step order and/or combination of fewer, additional and/or alternative steps may be employed that is suitable for employing a NIC of a target information handling system to broker a secure connection across network 133 between a target information handling system 100 and a given data center 157 via a connection broker system.

It will also be understood that one or more of the tasks, functions, or methodologies described herein (e.g., including those described herein for components 106, 108, 109, 152, 153, 156, 157 etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program includes instructions that are configured when executed on a processing device in the form of a programmable integrated circuit (e.g., processor such as CPU, controller, microcontroller, microprocessor, ASIC, etc. or programmable logic device "PLD" such as FPGA, complex programmable logic device "CPLD", etc.) to perform one or more steps of the methodologies disclosed herein. In one embodiment, a group of such processing devices may be selected from the group consisting of CPU, controller, microcontroller, microprocessor, FPGA, CPLD and ASIC. The computer program of instructions may include an ordered listing of executable instructions for implementing logical functions in an processing system or component thereof. The executable instructions may include a plurality of code segments operable to instruct components of an processing system to perform the methodologies disclosed herein.

It will also be understood that one or more steps of the present methodologies may be employed in one or more code segments of the computer program. For example, a code segment executed by the information handling system may include one or more steps of the disclosed methodologies. It will be understood that a processing device may be configured to execute or otherwise be programmed with software, firmware, logic, and/or other program instructions stored in one or more non-transitory tangible computer-readable mediums (e.g., data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A system, comprising a first information handling system coupled to a second information handling system and a third information handling system, the first information handling system comprising:
    a first programmable integrated circuit; and
    a network interface controller (NIC) coupled to the first programmable integrated circuit and implementing a network interface, the NIC comprising a second programmable integrated circuit integrated within the NIC and programmed to:
        broker an encrypted connection across a network between the second programmable integrated circuit of the NIC and the second information handling system,
        execute a virtual private network (VPN) client to broker the encrypted connection by establishing a first VPN across the network for encrypted network communications between the second programmable integrated circuit of the NIC and a third programmable integrated circuit of the second information handling system,
        decrypt first VPN data of encrypted network communications received across the first VPN from the third programmable integrated circuit of the second information handling system, and communicate the decrypted first VPN data to the first programmable integrated circuit, and
        encrypt data received from the first programmable integrated circuit and retransmit the encrypted data as first VPN data across the first VPN across the network to the third programmable integrated circuit of the second information handling system;
    where the third programmable integrated circuit of the second information handling system is programmed to:
        establish a second and different VPN across the network between the third programmable integrated circuit of the second information handling system and a fourth programmable integrated circuit of a third information handling system for encrypted network communications of the second encrypted connection between the third programmable integrated circuit of the second information handling system and the fourth integrated circuit of the third information handling system,
        receive and decrypt second VPN data received across the second VPN from the fourth programmable integrated circuit of the third information handling system, and encrypt and retransmit the decrypted second VPN data as the first VPN data to the second programmable integrated circuit of the NIC, and
        receive and decrypt first VPN data received across the first VPN from the second programmable integrated circuit of the NIC, and encrypt and retransmit the decrypted first VPN data as the second VPN data to the fourth programmable integrated circuit of the third information handling system.

2. The system of claim 1, where the second programmable integrated circuit of the NIC is programmed to broker the encrypted connection by tunneling out to the second information handling system across the network and without occurrence of tunneling into the first or second programmable integrated circuits of the information handling system from across the network.

3. The system of claim 1, where the first programmable circuit is programmed to execute a host operating system (OS); and where the second programmable integrated circuit of the NIC is programmed to:
    decrypt the first VPN data of encrypted network communications received across the first VPN from the third programmable integrated circuit of the second information handling system, and communicate the decrypted first VPN data to the OS executing on the first programmable integrated circuit; and
    encrypt data received from the OS executing on the first programmable integrated circuit and retransmit the encrypted data as first VPN data across the network to the third programmable integrated circuit of the second information handling system.

4. The system of claim 1, where the network comprises a public network, and where the NIC comprises a network interface coupled to the public network by local network hardware coupled between the first information handling system and the public network, the local network hardware comprising at least one of a router, switch, or firewall hardware.

5. The system of claim 1, where the NIC comprises non-volatile memory (NVM) integrated within the NIC that is coupled to the second programmable integrated circuit of the NIC, the NVM storing cryptographic key/s; and where the second programmable integrated circuit of the NIC is programmed to:
    broker the encrypted connection between the second programmable integrated circuit of the NIC and the second information handling system by retrieving and transmitting the cryptographic key/s across the network to the third programmable integrated circuit of the second information handing system as credentials for a VPN login to the second information handling system to establish the first VPN across the network for encrypted network communications between the second programmable integrated circuit of the NIC and the third programmable integrated circuit of the second information handling system;

decrypt the first VPN data of encrypted network communications received across the first VPN from the third programmable integrated circuit of the second information handling system, and communicate the decrypted first VPN data to the first programmable integrated circuit; and encrypt data received from the first programmable integrated circuit and retransmit the encrypted data as first VPN data across the network to the third programmable integrated circuit of the second information handling system.

6. The system of claim 1, where the second programmable integrated circuit of the NIC is programmed to automatically broker the encrypted connection across a network between the information handling system and the second information handling system at every power on event and/or at every booting of a host operating system (OS) executing on the first programmable integrated circuit of the information handling system.

7. An information handling system, comprising:
a first programmable integrated circuit; and
a network interface controller (NIC) coupled to the first programmable integrated circuit and implementing a network interface, the NIC comprising a second programmable integrated circuit integrated within the NIC and programmed to broker an encrypted connection across a network between the second programmable integrated circuit of the NIC and one or more external network entities separately from the first programmable integrated circuit;
where the second programmable integrated circuit of the NIC is further programmed to:
broker the encrypted connection by transmitting first cryptographic key/s across the network to a first one of the one or more external network entities as credentials to establish a first session of the first encrypted connection between the NIC and the first one of the one or more external network entities,
establish a second and different encrypted connection across the network between the NIC and a second different one of the one or more external network entities,
receive second cryptographic key/s from the second one of the one or more of external network entities across the second encrypted connection, the second cryptographic key/s being different from the first cryptographic key/s, and
transmit the second cryptographic key/s across the network to the first one of the one or more external network entities as credentials to establish a second and different session of the first encrypted connection between the NIC and the first one of the one or more external network entities.

8. An information handling system, comprising:
a first programmable integrated circuit; and
a network interface controller (NIC) coupled to the first programmable integrated circuit and implementing a network interface, the NIC comprising a second programmable integrated circuit integrated within the NIC and programmed to broker an encrypted connection across a network between the second programmable integrated circuit of the NIC and one or more external network entities separately from the first programmable integrated circuit;
where the information handling system is a bare metal server without any host OS installed on the information handling system and executing on the first programmable integrated circuit; and where the second programmable integrated circuit of the NIC is programmed to automatically broker the encrypted connection across a network between the information handling system and the one or more external network entities at a first power on event of the bare metal server with no host OS installed on the bare metal server.

9. A method, comprising:
operating a host programmable integrated circuit of a first information handling system coupled to a second programmable integrated circuit integrated within a network interface controller (NIC) of the first information handling system, the second programmable integrated circuit of the NIC being coupled in communication between the host programmable integrated circuit and a network;
operating the second programmable integrated circuit of the NIC to:
broker a first encrypted connection across the network between the second programmable integrated circuit of the NIC and a third programmable integrated circuit of a second information handling system in a manner that is separate from the host programmable integrated circuit of the first information handling system,
execute a virtual private network (VPN) client to broker the first encrypted connection by establishing a first VPN across the network for encrypted network communications of the first encrypted connection between the NIC and the third programmable integrated circuit of the second information handling system,
decrypt first VPN data of encrypted network communications received across the first VPN from the third programmable integrated circuit of the second information handling system, and communicate the decrypted first VPN data to the host programmable integrated circuit of the first information handling system, and
encrypt data received from the host programmable integrated circuit of the first information handling system and retransmit the encrypted data received from the host programmable integrated circuit of the first information handling system as first VPN data across the first VPN to the third programmable integrated circuit of the second information handling system; and
operating the third programmable integrated circuit of the second information handling system to:
establish a second and different VPN across the network between the third programmable integrated circuit of the second information handling system and a fourth programmable integrated circuit of a third information handling system for encrypted network communications of the second encrypted connection between the third programmable integrated circuit of the second information handling system and the fourth integrated circuit of the third information handling system,
receive and decrypt second VPN data received across the second VPN from the fourth programmable integrated circuit of the third information handling system, and encrypt and retransmit the decrypted second VPN data as the first VPN data to the second programmable integrated circuit of the NIC, and
receive and decrypt first VPN data received across the first VPN from the second programmable integrated circuit of the NIC, and encrypt and retransmit the decrypted first VPN data as the second VPN data to the fourth programmable integrated circuit of the third information handling system.

10. The method of claim 9, further comprising operating the second programmable integrated circuit of the NIC to broker the first encrypted connection by tunneling out across the network to the third programmable integrated circuit of the second information handling system and without occurrence of tunneling into the first or second programmable integrated circuits of the first information handling system from across the network.

11. The method of claim 9, further comprising:
executing a host operating system (OS) on the host programmable circuit of the first information handling system; and
operating the second programmable integrated circuit of the NIC to:
  decrypt the first VPN data of the encrypted network communications received across the first VPN from the third programmable integrated circuit of the second information handling system,
  communicate the decrypted first VPN data to the OS executing on the host programmable integrated circuit of the first information handling system; and
  encrypt the data received from the OS executing on the host programmable integrated circuit and retransmitting the second encrypted data as first VPN data across the first VPN to the third programmable integrated circuit of the second information handling system.

12. The method of claim 9, further comprising operating the third processing device of the second information handling system to bridge the first VPN and the second VPN to establish a data path from the host programmable integrated circuit of the first information handling system through the NIC to the fourth programmable integrated circuit of the third information handling system.

13. The method of claim 9, where the network comprises a public network, and where the NIC comprises a network interface coupled to the public network by local network hardware coupled between the first information handling system and the public network, the local network hardware comprising at least one of a router, switch, or firewall hardware.

14. The method of claim 9, further comprising operating the second programmable integrated circuit of the NIC to:
broker the first encrypted connection by transmitting cryptographic key/s across the network to the third programmable integrated circuit of the second information handling system for a VPN login to establish the first VPN across the network for encrypted network communications between the NIC and the third programmable integrated circuit of the second information handling system;
decrypt the first VPN data of encrypted network communications received across the first VPN from the third programmable integrated circuit of the second information handling system, and communicate the decrypted first VPN data to the host programmable integrated circuit; and
encrypt data received from the host programmable integrated circuit of the first information handling system and retransmit the encrypted data as first VPN data across the first VPN to the third programmable integrated circuit of the second information handling system.

15. The method of claim 9, further comprising operating the second programmable integrated circuit of the NIC to automatically broker the first encrypted connection across the network between the second programmable integrated circuit of the NIC and the third programmable integrated circuit of the second information handling system at every power on event and/or at every booting of a host operating system (OS) executing on the host programmable integrated circuit of the first information handling system.

16. A method, comprising:
operating a host programmable integrated circuit of a first information handling coupled to a second programmable integrated circuit integrated within a network interface controller (NIC) of the first information handling system, the second programmable integrated circuit of the NIC being coupled in communication between the host programmable integrated circuit and a network; and
operating the second programmable integrated circuit of the NIC to broker a first encrypted connection across the network between the second programmable integrated circuit of the NIC and a third programmable integrated circuit of a second information handling system in a manner that is separate from the host programmable integrated circuit of the first information handling system; and
where the method further comprises operating the second programmable integrated circuit of the NIC to:
  broker the first encrypted connection by transmitting first cryptographic key/s across the network to the third programmable integrated circuit of the second information handling system as credentials to establish a first session of the first encrypted connection between the NIC and the third programmable integrated circuit of the second information handling system,
  establish a second and different encrypted connection across the network between the NIC and a fourth programmable integrated circuit of a third information handling system,
  receive second cryptographic key/s from the fourth programmable integrated circuit of the third information handling system across the second encrypted connection, the second cryptographic key/s being different from the first cryptographic key/s; and
  transmit the second cryptographic key/s across the network to the third programmable integrated circuit of the second information handling system as credentials to establish a second and different session of the first encrypted connection between the NIC and the to the third programmable integrated circuit of the second information handling system.

17. A method, comprising:
operating a host programmable integrated circuit of a first information handling system coupled to a second programmable integrated circuit integrated within a network interface controller (NIC) of the first information handling system, the second programmable integrated circuit of the NIC being coupled in communication between the host programmable integrated circuit and a network; and
operating the second programmable integrated circuit of the NIC to broker a first encrypted connection across the network between the second programmable integrated circuit of the NIC and a third programmable integrated circuit of a second information handling system in a manner that is separate from the host programmable integrated circuit of the first information handling system;

where the first information handling system is a bare metal server; and were the method further comprises operating the second programmable integrated circuit of the NIC to automatically broker the first encrypted connection across the network between the first information handling system and the third programmable integrated circuit of the second information handling system at a first power on event of the bare metal server with no host OS installed on the bare metal server.

* * * * *